US007668941B1

(12) United States Patent
Kathandapani

(10) Patent No.: US 7,668,941 B1
(45) Date of Patent: Feb. 23, 2010

(54) SYSTEMS AND METHODS FOR IMPLEMENTING A TCP/IP STACK AND WEB INTERFACE WITHIN A MANAGEMENT MODULE

(75) Inventor: Govind Kathandapani, Snellville, GA (US)

(73) Assignee: American Megatrends, Inc., Norcross, GA (US)

( * ) Notice: Subject to any disclaimer, the term of this patent is extended or adjusted under 35 U.S.C. 154(b) by 874 days.

(21) Appl. No.: 10/879,826

(22) Filed: Jun. 29, 2004

(51) Int. Cl.
G06F 15/177 (2006.01)
G06F 15/16 (2006.01)
G06F 11/00 (2006.01)
(52) U.S. Cl. .................. 709/220; 709/217; 714/47; 714/48
(58) Field of Classification Search ......... 709/217–219, 709/223–226, 220; 714/48–57, 47
See application file for complete search history.

(56) References Cited

U.S. PATENT DOCUMENTS

| 5,535,338 | A  | * | 7/1996  | Krause et al. ............... 709/222 |
| 5,590,285 | A  | * | 12/1996 | Krause et al. ............... 709/218 |
| 6,373,841 | B1 |   | 4/2002  | Goh et al. |
| 6,681,232 | B1 |   | 1/2004  | Sistanizadeh et al. |
| 6,714,977 | B1 | * | 3/2004  | Fowler et al. ............... 709/224 |
| 6,804,627 | B1 |   | 10/2004 | Marokhovsky et al. |
| 6,922,722 | B1 | * | 7/2005  | Mann et al. .................. 709/220 |
| 6,971,044 | B2 | * | 11/2005 | Geng et al. .................. 709/226 |
| 6,983,324 | B1 |   | 1/2006  | Block et al. |
| 7,082,465 | B1 | * | 7/2006  | Martin et al. ............... 709/224 |
| 7,120,689 | B2 | * | 10/2006 | Gonsalves et al. .......... 709/224 |
| 7,143,153 | B1 |   | 11/2006 | Black et al. |
| 7,194,665 | B2 | * | 3/2007  | Gulick ........................ 714/47 |
| 7,206,833 | B1 | * | 4/2007  | Sarangam et al. ........... 709/224 |
| 7,231,430 | B2 | * | 6/2007  | Brownell et al. ............ 709/218 |
| 7,287,072 | B1 |   | 10/2007 | Dispensa et al. |
| 7,398,401 | B2 | * | 7/2008  | Goud et al. .................. 713/300 |
| 2002/0129098 | A1 | * | 9/2002  | Stone et al. .................. 709/203 |
| 2002/0152303 | A1 |   | 10/2002 | Dispensa |
| 2002/0165962 | A1 |   | 11/2002 | Alvarez et al. |
| 2002/0174207 | A1 |   | 11/2002 | Battou |
| 2003/0014517 | A1 |   | 1/2003  | Lindsay et al. |
| 2003/0023709 | A1 |   | 1/2003  | Alvarez et al. |

(Continued)

OTHER PUBLICATIONS

IPMI Intelligent Platform Management Interface Specification v1.5, Feb. 20, 2002, Intel HP, NEC Dell.*

(Continued)

*Primary Examiner*—Benjamin R Bruckart
(74) *Attorney, Agent, or Firm*—Hope Baldauff Hartman, LLC

(57) ABSTRACT

Methods and systems for implementing a network protocol stack and a web interface within a management module are provided. A network controller supports utilizing a plurality of media access control (MAC) addresses. The method involves configuring the network controller to allocate one of the MAC addresses to the management module where the management module is utilized in monitoring operations associated with the computer system. The network controller is programmed to send the management module, via the system interface, all network packets addressed to the MAC address allocated to the management module. The TCP/IP stack and the web interface are provided within the management module. Thus, when a network packet destined for the management module is received from a remote computer at the network controller, the network controller sends the network packet to the management module via the system interface thereby implementing a network protocol stack and web interface.

12 Claims, 4 Drawing Sheets

U.S. PATENT DOCUMENTS

| | | |
|---|---|---|
| 2003/0028633 A1 | 2/2003 | Lindsay et al. |
| 2003/0069953 A1 | 4/2003 | Bottom et al. |
| 2004/0073830 A1* | 4/2004 | Coteus et al. .................. 714/6 |
| 2004/0078456 A1* | 4/2004 | Kennedy et al. ............ 709/223 |
| 2004/0240440 A1* | 12/2004 | Wild et al. .................. 370/389 |
| 2004/0249913 A1* | 12/2004 | Kaufman, Jr. ............... 709/223 |
| 2005/0027858 A1 | 2/2005 | Sloth et al. |
| 2005/0080887 A1* | 4/2005 | Lee et al. .................... 709/223 |
| 2005/0091360 A1* | 4/2005 | Chen et al. .................. 709/223 |
| 2005/0267956 A1 | 12/2005 | Huang |
| 2005/0276092 A1* | 12/2005 | Hansen et al. ............... 365/149 |
| 2006/0095550 A1* | 5/2006 | Nemmaier et al. .......... 709/223 |

OTHER PUBLICATIONS

Microsoft Computer Dictionary 5$^{th}$ ed © 2002; definition of TCP, TCP/IP, TCP/IP stack.*

U.S. Official Action dated Aug. 27, 2008 in U.S. Appl. No. 10/879,831.

U.S. Official Action dated Mar. 24, 2009 in U.S. Appl. No. 10/879,831.

U.S. Official Action dated Jul. 9, 2009 in U.S. Appl. No. 10/879,831.

* cited by examiner

SYSTEMS AND METHODS FOR IMPLEMENTING A TCP/IP STACK AND WEB INTERFACE WITHIN A MANAGEMENT MODULE

CROSS REFERENCE TO RELATED APPLICATIONS

This application is related to subject matter disclosed in the U.S. patent Ser. No. 10/879,831, filed Jun. 29, 2004, entitled INTEGRATED NETWORK AND MANAGEMENT CONTROLLER, the subject matter of which is incorporated in this application by reference.

TECHNICAL FIELD

The present invention relates generally to computer platform management, and more particularly, to implementing a TCP/IP stack and web interface within a management module for use in a computer system.

BACKGROUND OF THE INVENTION

Generally, the term "computer system" refers to either a stand-alone system or a plurality of interconnected systems, such as, for instance, a client-server network. Regardless of the implementation, the various components making up a computer system typically operate within a range of parameters defined by performance protocols or standards. For instance, the temperature within a computer chassis is often monitored in order to detect periods in time when the system may rise above a certain predetermined temperature reading. Other forms of information that may be monitored within a computer system include, without limitation, voltages associated with semiconductor components located on the baseboard of the system, velocity (e.g., rpm) of cooling fans located on the baseboard or within the system chassis, and the velocity of spindle motors within hard disk drives or optical drives.

Various types of sensors are being used to detect operating and performance-related parameters associated with a computer system and its constituent components. Referring to the examples provided above, these sensors include thermostats, voltage meters and tachometers. A computer system typically employs one or more management modules to assist in the collection and analysis of information sensed by the various sensors measuring operating and performance-related parameters within the system. These management modules may be either software or hardware components, but typically encompass both hardware and software components. One such management module is referred to as a "Baseboard Management Controller" (BMC). The BMC is a microcontroller integrated into the baseboard (also known in the industry as the "motherboard") of a computer system and having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range, the occurrence of which is commonly referred to as an "event."

In legacy computer systems, remote interaction over a network between a remote computer and the BMC, for example in order to make sensor measurement inquiries, first requires communication between the remote computer and a management station. The management station is a separate server communicatively connected to one or more computer systems having BMCs. The management station implements a transmission control protocol/Internet protocol (TCP/IP) stack and provides a web server that interfaces with remote computers over a network, such as the Internet. The management station in turn communicates with the network controller of the computer system having the BMC via a specified port, such as 26Fh, using the remote management control protocol (RMCP). RMCP is a user datagram protocol (UDP) addressed to port 26Fh. Communication received by the network controller of the host computer system via this specified port signals the network controller to filter or forward the received communication to the BMC. This process is known as port-based filtering.

Unfortunately, because the network controller of the host computer system only supports the use of one media access control (MAC) address, the network controller can only filter network messages to the BMC utilizing port-based filtering. Further, because UDP network messages are not reliable for accurate and efficient transmission over a network from great distances, direct communication with the BMC over a network utilizing RMCP is also not efficient. Because only RMCP packets are forwarded, the BMC cannot use an advanced networking protocol like TCP/IP. Thus, the use of the separate network controller utilizing a TCP/IP stack and management station for communication over the network is necessary in order to provide a web server for network communication with the BMC.

This current approach has at least two drawbacks. First, this approach of remotely communicating with a BMC comes with the added cost of a separate management station for providing a web interface to the BMC. Second, this approach is time-consuming, requiring communication with the management station prior to communicating with the BMC of any server managed by the management station.

SUMMARY OF THE INVENTION

Embodiments of the present invention address these problems and others by providing methods and systems for implementing a network protocol stack, such as TCP/IP stack, and a web interface within a management module. Network controllers of computer systems support system interfaces for communication with management modules, such as the BMC. The management module may send and receive network packets to and from the network via the system interface and the network controller. Additionally, embodiments of the present invention allow the management module firmware to program the network controller to allocate a separate hardware address, such as a media access control (MAC) address, to the management module in order to filter network packets intended for the management module. All network packets sent to the separate hardware address allocated to the management module will be forwarded to the management module via the system interface. Utilizing this forwarding feature, the management module firmware may implement an entire network protocol stack and a web server thereby removing the necessity of a management station to implement a network protocol stack.

One embodiment of the invention is a computer-implemented method for implementing a TCP/IP stack and web server within a management module of a computer system via a system interface of a network controller where the network controller supports utilizing a plurality of MAC addresses.

The method involves configuring the network controller to allocate one of the MAC addresses to the management module where the management module is utilized in monitoring operations associated with the computer system. The network controller is programmed to send the management module, via the system interface, all network packets addressed to the MAC address allocated to the management module. The TCP/IP stack and the web interface are provided within the management module. A network packet addressed to one of the MAC addresses is received from a remote computer at the network controller. The network packet received may be sent to the management module via the system interface thereby establishing direct communication with the management module over a network without utilizing a second network controller to implement the TCP/IP stack.

Another embodiment of the invention is a computer-implemented method for receiving and sending network communications over a network at and from a management module of a computer system where the management module is utilized to perform monitoring operations associated with the computer system. The method involves programming a network controller of the computer system to allocate a MAC address to the management module and filter network communications addressed to the MAC address to the management module via a system interface of the network controller where the network controller is capable of supporting at least two MAC addresses. A TCP/IP stack and a web server are implemented within the management module. The network communications addressed to the MAC address allocated to the management module are received at the management module from the network controller via the system interface.

Still another embodiment of the invention is a system for implementing a network protocol stack and web server within a management module of a computer system, where the management module is used in monitoring operations associated with the computer system. The system includes a network controller that receives and sends network packets over a network and supports at least two hardware addresses. The management module programs the network controller to allocate one of the hardware addresses to the management module and to send the management module network packets addressed to the hardware address allocated to the management module. The management module also executes the network protocol stack and the web server thereby enabling direct communication over the network with the management module via the network controller. The system also includes a system interface for conveying the network packets addressed to the hardware address allocated to the management module between the network controller and the management module.

BRIEF DESCRIPTION OF THE DRAWINGS

Figure 1:
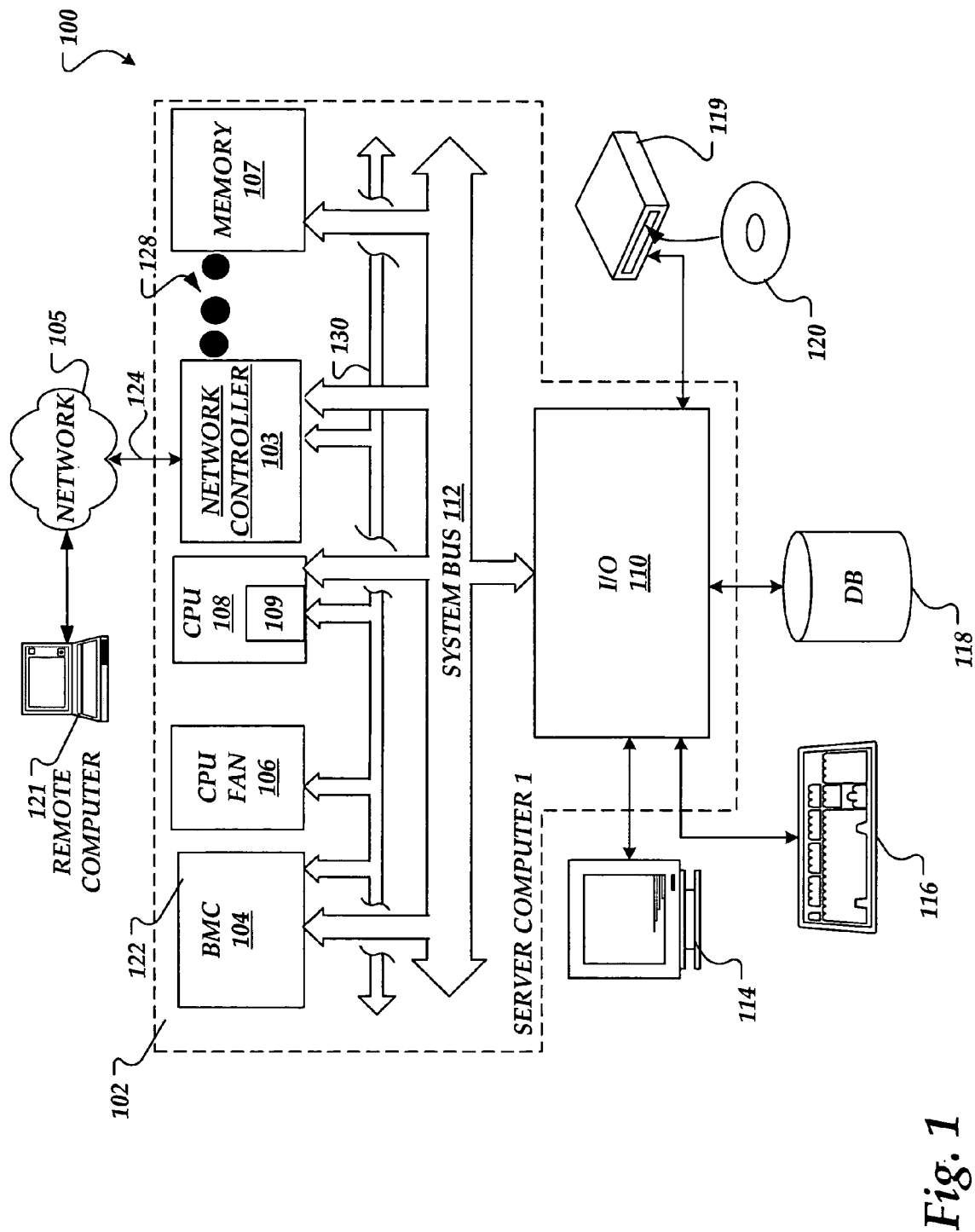

Having thus described the invention in general terms, reference will now be made to the accompanying drawings, which are not necessarily drawn to scale, and wherein:

FIG. 1 depicts a network operating environment for embodiments of the invention in which a remote computer communicates with a computer system housing a network controller and a management module that monitors and analyzes the operation of various components of the computer system.

Figure 2:
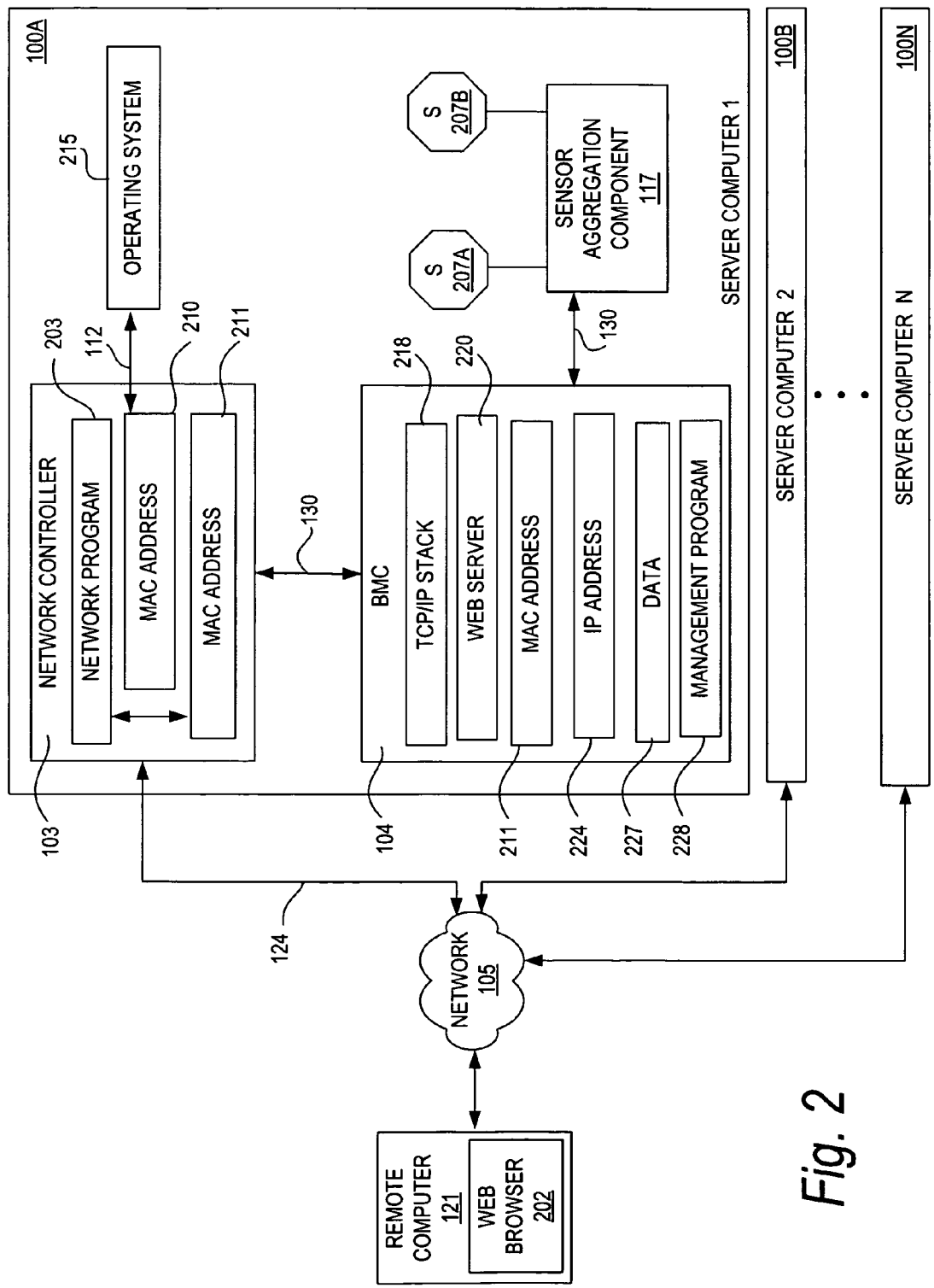

FIG. 2 illustrates a logical configuration of components communicatively connected to the management module of FIG. 1 in accordance with an embodiment of the present invention.

Figure 3:
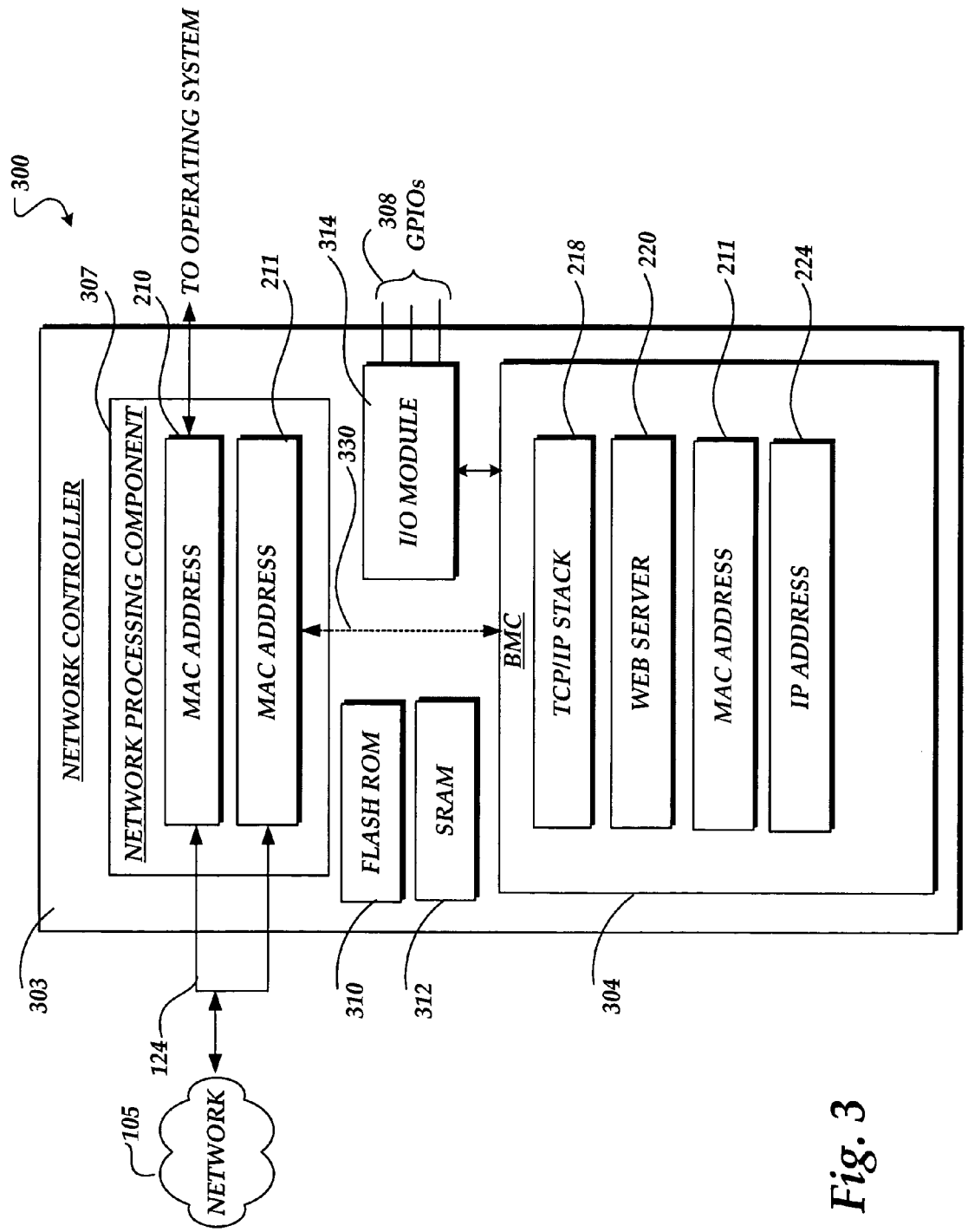

FIG. 3 depicts a block diagram of an apparatus integrating a network and management controller illustrating components within the apparatus in accordance with another embodiment of the present invention.

Figure 4:
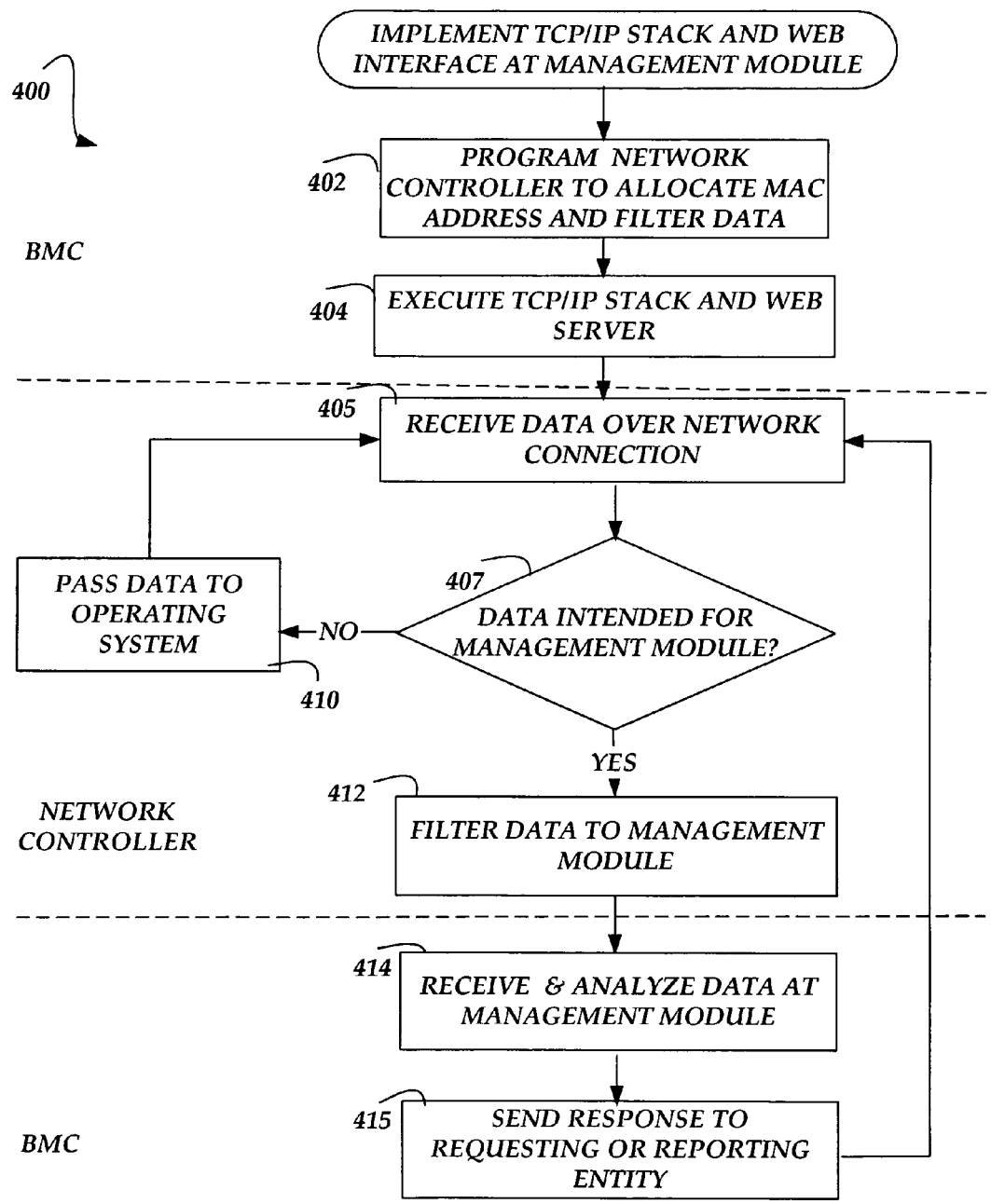

FIG. 4 is a flow diagram that illustrates operational characteristics for implementing a TCP/IP stack and web interface at a management module used in monitoring operations associated with the computer system of FIG. 1 in accordance with an embodiment of the present invention.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a conceptual illustration of an operating environment associated with the present invention is shown in accordance with an embodiment of invention. FIG. 1 shows a computer system 100 networked with a remote computer 121. The computer system 100 may be a general purpose computer system. It should be appreciated that the computer system 100 may alternatively be a "special purpose" computer system or a system that incorporates more than one interconnected system, such as a client-server network. Indeed, the computer system 100 of FIG. 1 only represents an exemplary embodiment of the present invention, and therefore, should not be considered to limit the invention in any manner.

The central intelligence of the computer system 100 is a baseboard 102, or "motherboard", which is a printed circuit board on which a multitude of components or devices may be installed and connected by way of a system bus 112 or other electrical communication path (not shown). In an embodiment, these components include without limitation a network controller 103, a management module, such as a BMC 104, a central processing unit (CPU) 108, memory 107, and an input/output module 110. It is also contemplated that the system bus 112 may include other components that are not explicitly shown in FIG. 1. As such, repetition dots 128 illustrate the possible connection of these other components to the system bus 112. The layout of components, and the manner in which the components are interconnected, on the baseboard 102 is herein referred to as the "configuration" of the baseboard 102.

The system bus 112 provides a two-way communication path for all components connected to the system bus 112. The component that initiates a communication on a bus is referred to as a "master" component and the component to which the initial communication is sent on the bus is referred to as a "slave" component. A master component therefore issues an initial command to or initially requests information from a slave component. Each slave component is addressed, and thus communicatively accessible to master components, by a particular slave address. Both master components and slave components are operable to transmit and receive communications over the system bus 112. Buses and the associated functionality of master-slave communications are well-known to those skilled in the art, and therefore not discussed in further detail herein.

The CPU 108 is a standard central processor that performs arithmetic and logical operations necessary for the operation of the computer system 100. CPUs are well-known in the art, and therefore not described in further detail herein. Like many electrical components, the CPU 108 dissipates heat while operating. As such, a CPU fan 106 is used to cool off the CPU 108 after the CPU 108 reaches a prescribed temperature. Such a determination, i.e., whether the CPU 108 exceeds a prescribed temperature, is made by the BMC 104, which is communicatively coupled by way of a management bus 130 (described in the following paragraph) to a CPU temperature sensor 109 and the CPU fan 106 to provide monitoring functionality over the temperature sensor 109 and control functionality over the CPU fan 106.

In general, the BMC 104 is a microcontroller that monitors operation of the computer system 100. In a more specific embodiment, the BMC 104 monitors health-related aspects associated with the computer system 100, such as, but not limited to, the temperature of one or more components of the computer system 100, speed of rotational components (e.g., spindle motor, CPU Fan, etc.) within the system, the voltage across or applied to one or more components within the system 100, and the available or used capacity of memory devices within the system 100. To accomplish these monitoring functions, the BMC 104 is communicatively connected to one or more components by way of a system interface such as the management bus 130. In an embodiment, these components include sensor devices for measuring various operating and performance-related parameters within the computer system 100. The sensor devices may be either hardware or software based components configured or programmed to measure or detect one or more of the various operating and performance-related parameters. A sensor aggregation component 117 may receive this information sensed by the sensors and provide this information to the BMC 104 via the management bus 130 for analysis, and more particularly, for determination as to whether an "event" is occurring within the computer system 100. Additional details regarding sensors and the sensor aggregation component 117 will be described below with respect to FIG. 2.

Like the system bus 112, the component that initiates communication on a bus is referred to a master and the component to which the communication is sent is referred to a slave. As such, the BMC 104 functions as the master on the management bus 130 in most circumstances, but may also function as either a master or a slave in other circumstances. Each of the various components communicatively connected to the BMC 104 by way of the management bus 130 is addressed using a slave address.

The management bus 130 is used by the BMC 104 to request and/or receive various operating and performance-related parameters from one or more components, which are also communicatively connected to the management bus 130. In the embodiment of FIG. 1, the management bus 130 communicatively connects the BMC 104 to the CPU temperature sensor 109 and the CPU fan 106, thereby providing a means for the BMC 104 to monitor and/or control operation of these components. As with the system bus 112, the management bus 130 may include components other than those explicitly shown in FIG. 1. Exemplary components not shown in FIG. 1 may include, without limitation, tachometers, heat sensors, voltage meters, amp meters, and digital and analog sensors. In an embodiment, the management bus 130 is an I²C bus, which is manufactured by PHILIPS SEMICONDUCTOR and described in detail in the I²C bus Specification, version 2.1 (January 2000).

Firmware may be utilized in the BMC 104 that adheres to the Intelligent Platform Management Interface (IPMI) industry standard for system monitoring and event recovery. The IPMI standard is well-known to those of ordinary skill in the industry, and therefore not described in detail herein. Rather, revision 1.1 of the IPMI Specification, version 2.0 rev. 1.0, published Feb. 12, 2004, is incorporated by reference.

The BMC 104 monitors operating and performance-related parameters received from various components of the computer system 100 in order to determine whether an "event" is occurring within the system 100. In an embodiment, these components may be either directly or indirectly connected to the baseboard 102. For example, with respect to the configuration shown in FIG. 1, the BMC 104 monitors operation of the CPU 108 (by way of the CPU temperature sensor 109) and the CPU fan 106 to determine whether certain operating or performance related parameters exceed or fall below prescribed threshold ranges of operation. An example of such an event may be the temperature reading of heat dissipated by the CPU 108 reaching in excess of 145 degrees Fahrenheit.

In accordance with another embodiment of the invention, the BMC 104 may also control one or more components of the computer system 100 in response to the occurrence of an event. Referring back to the example above, the BMC 104 may initiate operation of the CPU fan 106 upon determining that the temperature dissipated by the CPU 108 has reached 146 degrees Fahrenheit. In addition, it is also contemplated that the BMC 104 may also be connected to and receive sensed information from components connected directly to a contact pin of the BMC 104 or indirectly by way of a bus (e.g., system bus 112) other than the management bus 130.

The network controller 103 is capable of connecting the computer system 100 to a network 105 of remote computers via a network link 124. Examples of such systems include SPARC systems offered by SUN MICROSYSTEMS, INC., personal computers offered by IBM CORPORATION and by other manufacturers of IBM-compatible personal computers, and other systems running a UNIX-based or other operating system. A remote computer, such as the remote computer 121, may be a desktop computer, a server, a router, a network PC (personal computer), a peer device or other common network node, and typically includes many or all of the elements described above relative to the computing system 100. Networked logical connections may include a local area network (LAN) or a wide area network (WAN). Such networking environments are commonplace in offices, enterprise-wide computer networks, intranets, and the Internet.

The input/output module 110 may be used as a communication medium between any number and type of peripheral devices and the system bus 112. Communications destined for the CPU 108, the BMC 104 or any other component coupled to the system bus 112 and issued by a peripheral device may need to pass through the input/output module 110 to the system bus 112 and then to the necessary component. Exemplary peripheral devices are shown in FIG. 1 and described below.

In the embodiment of FIG. 1, the input/output module 110 is connected to a user input module 116, e.g., a keyboard, a display unit 114 and one or more program storage devices, such as, without limitation, the disk storage unit 118 and the disk drive unit 119. The user input module 116 is shown as a keyboard, but may also be any other type of apparatus (e.g., joystick, mouse, etc.) for inputting commands into the CPU 108 or the microcontroller 104. In accordance with one embodiment, the disk drive unit 119 is a CD-ROM driver unit capable of reading the CD-ROM medium 120, which typically contains programs and data. In accordance with an alternative embodiment, the disk drive unit 119 may be replaced or supplemented by a floppy drive unit, a tape drive unit, or other storage medium drive unit.

In accordance with yet another embodiment, the computing system 100 further comprises an operating system and usually one or more application programs. Such an embodiment is familiar to those of ordinary skill in the art. The operating system comprises a set of programs that control operations of the computing system 100 and allocation of resources. The set of programs, inclusive of certain utility programs, may also provide a graphical user interface to the user. An application program is software that runs on top of the operating system software and uses computer resources made available through the operating system to perform application specific tasks desired by the user. In accordance with an embodiment, the operating system employs a graphical user interface wherein the display output of an application program is presented in a rectangular area on the screen of the display device 114. The operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT" operating systems, IBM's OS/2 WARP, APPLE's MACINTOSH OSX operating system, LINUX, UNIX, etc.

Referring now to FIG. 2 a logical configuration of components communicatively connected to the BMC 104 of FIG. 1 in accordance with an embodiment of the present invention will be described. The remote computer 121 includes a web browser 202, such as the INTERNET EXPLORER web browser from MICROSOFT CORPORATION of Redmond, Wash., that enables the remote computer 121 to communicate over the network 105 with the BMC 104 of the computer system 100A. It should be appreciated that the computer system 100A, as illustrated in FIG. 2, is a server computer in a server farm and the remote computer 121 may similarly communicate over the network 105 with other server computers 100B-100N in the server farm.

The network controller 103, such as BCM 5704 from BROADCOM CORPORATION of Irvine, Calif., supports at least two MAC addresses (e.g. 210, 211) and is communicatively connected to the BMC via the management bus 130. The network controller 103 allocates the MAC address 210 to the operating system of the computer system 100A and may be programmed by the BMC 104 firmware to allocate the MAC address 211 to the BMC 104. The network controller 103 also includes a network program 203 for processing network communications sent to and from the network controller. The network program 203 forwards network packets sent from the remote computer 121 addressed to the MAC address 210 to the operating system 215 of the computer system 100A via the system bus 112. Network packets sent from the remote computer 121 that are addressed to the MAC address 211 are forwarded to the BMC 104 via the management bus 130.

The BMC 104 includes a TCP/IP stack 218, a web server application program 220, and the MAC address 211 that identifies the BMC 104 as the destination of network packets addressed to the MAC address 211. Thus, by executing the web server application program 220 and the TCP/IP stack 218, and programming the network controller 103 to forward network packets addressed to the MAC address 211, the BMC 104 can receive and respond to requests for management information via a web interface. This implementation enables direct communication from the remote computer 121 to the BMC 104 without the need for another network controller to implement a network protocol stack. Further, because the BMC 104 has been allocated a MAC address, an IP address 224 may also be allocated to the BMC 104. The IP address 224 identifies the BMC 104 on the TCP/IP network so that network packets may routed to and from the BMC 104 the IP address 224. The IP address 224 may also be allocated a domain name that may be utilized in a URL to identify one or more web pages available from the web server application program 220.

The BMC 104 also includes a management program 228 representing the BMC 104 firmware that configures or programs the network controller 103 to filter or pass network packets addressed to the MAC address 211 and received over the network 105 to the BMC 104. The management program 228 also monitors, analyzes, and communicates measured operating and performance-related parameters within the computer system 100A sensed via the sensors 207A-207B and aggregated via the sensor aggregation component 117. The sensors 207A-207B measure or sense operating and performance-related parameters associated with the computer system 100A. The sensor aggregation component 117 receives this information sensed by the sensors 207A-207B and provides this information to the BMC 104 via the system interface 130 for analysis, and more particularly, for determination on whether an "event" is occurring within the computer system 100A.

The sensor aggregation component 117 is shown in FIG. 2 as an LM-XX device (e.g., LM-78, LM-85, and LM-93 model logic components) from NATIONAL SEMICONDUCTOR, but may be any type of hardware and/or software component capable of receiving sensed information and managing the delivery of this information to the BMC 104. Alternatively, the sensor aggregation component 117 may be operable to not only collect and forward sensed information, but also to analyze the sensed information to render advice on the parameters being monitored by the sensors 207A-207B. Even further, the sensor aggregation component 117 may be programmed with firmware operable for performing sensing and measuring functions substantially similar to those functions performed by the sensors 207A-207B. The BMC 104 then analyzes the information sensed by the sensors 207A-207B and either (1) issues an alert that an event is occurring; and/or (2) controls operation of one or more components within the computer system based on the determination that an event is taking place.

While the sensors 207A-207B are described in general terms when describing FIG. 2, it should be appreciated that these sensors 207A-207B may be digital or analog sensors that sense any type of information. For example, the sensors 207A-207B may sense, without limitation, temperature of a component (e.g., CPU 108) of the computer system 100A, temperature within the chassis of the computer system 100A, a voltage and/or current reading associated with a component of the computer system 100A, or velocity and/or acceleration of a component (e.g., spindle motor, etc.) of the computer system 100A. It is also contemplated that the sensors 207A-207B may be implemented as a software/firmware routine that senses information related to events associated with operation of either firmware or software modules implemented on the computer system 100A. One such sensor 207A or 207B may be a software routine for detecting whether a particular software application program is "locked up," and therefore not operating properly.

The sensed operating and performance-related parameters may be stored as data 227 in the BMC 104 for subsequent retrieval and forwarding, for example via the implemented web interface. For instance, the remote computer 121 may send a network packet to the BMC 104 that makes an inquiry regarding a sensed parameter. In response, the BMC 104 may retrieve the sensed parameter and forward the result to the remote computer 121 via the web interface. Additional details regarding the implementation of the TCP/IP stack and web interface will be described below in reference to FIG. 4.

Referring now to FIG. 3, a block diagram of an apparatus integrating a network controller and a management controller is shown illustrating components within the apparatus in accordance with another embodiment of the present invention. The apparatus 300 is an integrated chip that integrates a network controller 303 and a BMC 304. In this embodiment the BMC 304 is embedded onto the network controller 303 as a microcontroller having both network processing and management functionality. The network controller 303 supports at least two MAC addresses (e.g. 210, 211) as described above. Network packets sent to the apparatus 300 over the network 105 via the network connection 124 and a network processing component 307 are routed to the MAC address 210 or the MAC address 211. As described above, the network packets addressed to the MAC address 210 are filtered or forwarded to the operating system 215 of the computer system 100A by the network processing component 307. The network packets addressed to the MAC address 211 are filtered by the network processing component 307 to the BMC 304 via a logical connection 330 internal to the apparatus 300. The network processing component may be an application specific integrated circuit ("ASIC").

The network program 203, the management program 228 (shown in FIG. 2) and an operating system program (not shown) for the apparatus 300 are stored in the flash ROM 310. The SRAM 312 may store measured performance-related data associated with the computer system 100A. The apparatus 300 also may include an input/output module 314 and general-purpose input/outputs 308 for communication with other components of the computer system 100A. Additional details regarding the integrated network and management controller are described in the related U.S. patent application Ser. No. 10/879,831 filed Jun. 29, 2004 entitled INTEGRATED NETWORK AND MANAGEMENT CONTROLLER, the subject matter of which is incorporated in this application by reference.

Referring now to FIG. 4, a process 400 for implementing a TCP/IP stack and web interface within a management module used in monitoring operations associated with the computer system 100A in accordance with an embodiment of the present invention will be described. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto. In this embodiment, the modeling process 400 shown in FIG. 4 and described below encompasses logical operations of the management program 228.

The process 400 is implemented using an operation flow beginning with a program operation 402 where the management program 228 programs the network controller 103 to allocate one of the supported MAC addresses to the BMC 104 and filter data or network packets addressed to the MAC address B 211 to the BMC 104. As described above the network controller 103 is programmed by the management program 228 to filter the network packets based on the MAC address allocated for the BMC 104.

The process 400 then continues to execute operation 404 where the BMC 104 provides the TCP/IP stack 218 and the web server 220 to facilitate web-based communication with the BMC 104. Next the process 400 continues to receive operation 405 where one or more network packets are received over the network link 124. The network packets received may be a request for operational information directed to the BMC 104 or it may be data unrelated to the BMC. The process 400 then continues to filter operation 407.

At the filter operation 407, the network controller 103 determines whether the network packet is intended or destined for the BMC 104 by detecting the MAC address. If the data is not intended for the BMC 104, the process 400 continues from the filter operation 407 to send operation 410. At send operation 410 the network controller 103 sends the data to the operating system 215 of the computer system 100A via the system bus 112. The process 400 the returns to receive operation 405 described above.

If at the filter operation 407, the network packet data is determined intended for the BMC 104, the process 400 continues to pass operation 412. At pass operation 412, the network controller 103 passes the network packet data to the BMC 104 via a system interface, such as the management bus 130 or the internal logic connection 330.

From pass operation 412, the process 400 continues to receive operation 414 where network packet data is received and analyzed at the BMC 104 from the network controller 103 via the system interface. The data received may include a request from over the network for operational information regarding one or more components of the computer system 100A.

From the receive operation 414, the process 400 continues to response operation 415. At the response operation 415, the BMC 104 sends a response to any active request and/or out-of-limit parameters to the requesting entity and/or reporting entity. The response may be passed to the network controller 103, via the system interface, and then sent over the network link 124. For instance, a requested parameter measurement may be sent to the remote computer 121 via the network link 124. From the response operation 415, the operation flow returns to receive operation 405 described above.

Thus, the present invention is presently embodied as a method, system, computer program product, or computer readable media encoding a computer program implementing a TCP/IP stack and web interface within a management module.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-implemented method for managing a computer system over a network, the method comprising:

providing a motherboard management module within the computer system;

configuring the motherboard management module to collect operating parameters associated with the computer system;

providing a network controller within the computer system and in communication with the network;

interconnecting the network controller and the motherboard management module over a management bus, the network controller and the motherboard management module being integrated on the same chip;

interconnecting the network controller and a central processing unit over a system bus;

configuring the network controller to associate a first media access control address to the central processing unit having a first network protocol stack, the network controller configured to pass network packets intended for the first media access control address to the central processing unit;

configuring the network controller to associate a second media access control address to the motherboard management module, the network controller configured to filter network packets intended for the second media access control address to the motherboard management module;

providing a second network protocol stack within the motherboard management module;

implementing TCP/IP within the second network protocol stack;

implementing a web server application within the motherboard management module and in communication with the second network protocol stack;

receiving a management request intended for the second media access control address at the network controller;

filtering the management request intended for the second media access control address to the motherboard management module with the network controller;

receiving the management request intended for the second media access control address at the motherboard management module;

upon receiving the management request intended for the second media access control address at the motherboard management module, collecting operating parameters corresponding to the management request;

formatting the collected operating parameters for exposure from the web server application over the network to a web browser; and communicating the formatted operating parameters from the motherboard management module to the network controller, the network controller configured to provide the formatted operating parameters to the web browser over the network.

2. The method of claim 1, further comprising determining whether a network packet received includes the second media access control address allocated to the motherboard management module, wherein the network packet received is sent to the motherboard management module in response to the network packet received including the second media access control address.

3. The method of claim 2, wherein the method further comprises, in response to the network packet received including the first media access control address, sending the network packet received to the central processing unit.

4. The method of claim 1, further comprising receiving at the motherboard management module, a network packet received at the network controller.

5. The method of claim 1, wherein the management request is directed to a universal resource locator (URL) associated with the motherboard management module.

6. The method of claim 1, further comprising sending a network packet from the motherboard management module over the network to a remote computer via the management bus and the network controller.

7. A computer-implemented method for supporting network communications at a management module of a computer system, the method comprising:

providing the management module within the computer system;

configuring the management module to collect operating parameters associated with the computer system;

providing a network controller within the computer system and in communication with a network;

interconnecting the network controller and the management module over a management bus, the network controller and the management module being integrated on the same chip;

interconnecting the network controller and a central processing unit over a system bus;

programming the network controller of the computer system to allocate a first media access control (MAC) address to an operating system associated with the computer system, the network controller configured to pass network communications addressed to the first media access control address to the operating system via a system bus;

programming the network controller of the computer system to allocate a second MAC address to the management module, the network controller configured to filter network communications addressed to the second MAC address to the management module via a logical connection internal to an integrated circuit, the integrated circuit comprising the management module and the network controller;

implementing a TCP/IP stack within the management module;

implementing a web server application within the management module, the web server application associated with the TCP/IP stack;

receiving the network communications addressed to the second MAC address from the network controller at the management module;

configuring the web server application to provide management information associated with the computer system to a web browser over a network;

receiving a management query addressed to the second media access control address at the network controller;

filtering the management query addressed to the second media access control address to the management module with the network controller;

receiving the management query addressed to the second media access control address at the management module;

upon receiving the management query addressed to the second media access control address at the management module, collecting operating parameters corresponding to the management query;

formatting the collected operating parameters for exposure from the web server application over the network to a web browser; and communicating the collected operating parameters from the management module to the network controller, the network controller configured to provide the formatted operating parameters to the web browser over the network.

8. The method of claim 7, wherein the management module further includes at least one of an IP address and a domain name allocated to the management module.

9. The method of claim 7, wherein the system interface comprises a management bus.

10. The method of claim 7, further comprising sending network communications from the management module over a network to a remote computer via the system interface and the network controller.

11. A system for managing a computer system over a network, the system comprising:
- a management module within the computer system, the management module configured to collect operating parameters associated with the computer system;
- a network controller within the computer system and in communication with the network, the network controller and the management module interconnected over a management bus, the network controller and the management module being integrated on the same chip, the network controller and a central processing unit interconnected over a system bus;
- wherein the network controller is configured to (a) associate a first media access control address to the central processing unit having a first network protocol stack, (b) pass network packets intended for the first media access control address to the central processing unit, (c) associate a second media access control address to the management module, and (d) filter network packets intended for the second media access control address to the management module;
- a second network protocol stack implemented within the management module, wherein TCP/IP is implemented within the second network protocol stack;
- wherein the network controller is further configured to receive a management request intended for the second media access control address and to filter the management request intended for the second media access control address to the management module;
- wherein the management module is further configured to receive the management request intended for the second media access control address and when the management request intended for the second media access control address is received, to collect operating parameters corresponding to the management request; and
- a web server application implemented within the management module and in communication with the second network protocol stack, the web server application configured to format the collected operating parameters for exposure from the web server application over the network to a web browser and to communicate the formatted operating parameters from the management module to the network controller, the network controller further configured to provide the formatted operating parameters to the web browser over the network.

12. The system of claim 11, wherein the management module comprises a baseboard management controller implemented on a baseboard of the computer system.

* * * * *

UNITED STATES PATENT AND TRADEMARK OFFICE
CERTIFICATE OF CORRECTION

PATENT NO. : 7,668,941 B1  Page 1 of 1
APPLICATION NO. : 10/879826
DATED : February 23, 2010
INVENTOR(S) : Govind Kothandapani It is certified that error appears in the above-identified patent and that said Letters Patent is hereby corrected as shown below:

Title page, item [75] Inventor Name: should read -- Govind Kothandapani --

Signed and Sealed this

Thirteenth Day of July, 2010

David J. Kappos
*Director of the United States Patent and Trademark Office*